United States Patent [19]

Hapgood

[11] 4,214,272

[45] Jul. 22, 1980

[54] VIDEO HIGHLIGHT ATTENUATION PROCESSOR

[75] Inventor: John H. Hapgood, Daleville, Ala.

[73] Assignee: The United States of America as represented by the Secretary of the Army, Washington, D.C.

[21] Appl. No.: 30,789

[22] Filed: Apr. 17, 1979

[51] Int. Cl.² ............................................. H04N 5/197
[52] U.S. Cl. ....................................... 358/170; 358/243
[58] Field of Search ................. 358/160, 168, 170, 243

[56] References Cited

U.S. PATENT DOCUMENTS

| | | | |
|---|---|---|---|
| 2,414,228 | 1/1947 | Gottier | 358/243 |
| 2,424,349 | 7/1947 | Cawein | 358/243 |
| 2,978,537 | 4/1961 | Kruse, Jr. et al. | 358/168 |
| 3,179,743 | 4/1965 | Ahrons et al. | 358/243 |
| 3,558,816 | 1/1971 | Wise | 358/170 |
| 3,560,645 | 2/1971 | Wallace | 358/170 |

Primary Examiner—Robert L. Griffin
Assistant Examiner—Michael A. Masinick
Attorney, Agent, or Firm—William G. Gapcynski; Sherman D. Winters; Werten F. W. Bellamy

[57] ABSTRACT

A video highlight attenuation processor is disclosed which comprises an input circuit from which first and second signals corresponding to an input signal are derived, a peak detecting and inverting circuit which detects and inverts peak portions of the first signal to produce an intermediate signal, and a mixer which combines the intermediate signal and the second signal such that an output signal is produced which corresponds to the input signal with the D.C. level of the peak portions attenuated.

4 Claims, 4 Drawing Figures

VIDEO HIGHLIGHT ATTENUATION PROCESSOR

FIELD OF THE INVENTION

The present invention relates in general to television systems and in particular to video highlight attenuation processors for television camera monitors.

BACKGROUND OF THE INVENTION

There are three types of "blooming" which occur in television systems. One type is "spot" blooming, which results from the brightness and contrast controls of the television receiver or monitor being improperly set such that the receiver or monitor does not operate within the linear region of the camera.

Another type of blooming, associated with receivers, is caused by atmospheric conditions or man-made disturbances, usually of a temporary nature.

The present invention concerns the third type of blooming, and this type is caused by bright lights within the televised scene. Blooming of this type results from the inability of the electron beam in the camera to neutralize completely the affected area of the target. When this type of blooming effect occurs, the scene as viewed on a monitor appears to be washed out. Further, when bright areas appear within the scene, they are very distracting to the viewer. The net result in both cases is a loss of information within and adjacent to the affected areas.

Various mechanical methods have been used in the prior art to overcome the scene-related type of blooming. For example, one of these methods involves the use of a motorized iris within the lens, while another method uses a motorized filter wheel. Such mechanical methods have a major disadvantage in that, although they do attenuate the bright areas, they also attenuate the scene around the affected areas.

Electronic circuits have also been employed in the prior art to compensate for the various types of blooming noted above. Examples of such circuits are disclosed in U.S. Pat. Nos. 2,414,228 (Gottier); 2,978,537 (Kruse et al.); and 3,179,743 (Ahrons). The Gottier circuit employs a blocking diode to clip the white peaks of the video signal above a preset level to reduce blooming. A disadvantage of this type of circuit is that any information within the bright area is completely lost. Although this loss of information can be tolerated in a home television receiver, such loss cannot be tolerated in more demanding applications, such as, for example, a military environment.

The Kruse et al. circuit uses an averaging technique to produce a direct current (D.C.) voltage, the amplitude of which is an inverse function of the average peak-to-peak value of the video signal over a pre-determined time period, for controlling or serving as the supply voltage for one or more of the camera tube electrodes. This method of control has the disadvantage of affecting the overall picture and not just the high peaks of the signal which produce the blooming effect. The Kruse et al. method of control has the further disadvantage of introducing a time delay in the circuit because of the closed loop configuration which is employed.

The Ahrons circuit is directed to control of spot blooming resulting from the contrast control being set too high, and employs for this purpose two diodes by which the white peaks which would cause blooming are separated from the rest of the video signal. The separated white peak signals are then amplified to provide a D.C. control signal which is used to control the AGC voltage so as to decrease the overall set gain. The Ahrons circuit thus suffers from the same disadvantage as does the Kruse et al. circuit.

Electronic circuits are also known in the prior art which compensate for noise pulses. An example of such a circuit as employed in a television receiver is disclosed in U.S. Pat. No. 2,424,349 (Cawein). The Cawein circuit eliminates random rate noise pulses resulting from atmospheric or man-made disturbances which can cause instability in the video and sync circuits of a receiver. This purpose is achieved in the Cawein circuit by demodulating the carrier wave to separate out noise currents having intensities in excess of a predetermined level, inverting the demodulated noise signal, and combining the inverted signal with the carrier wave to eliminate the demodulated noise signals therefrom. The Cawein circuit would be inappropriate for use in controlling scene-related blooming, since any information in the demodulated signals representing the bright areas would be lost by the cancelling effect produced by the Cawein circuit.

SUMMARY OF THE INVENTION

These and other disadvantages of the prior art are overcome by the video highlight attenuation processor of the present invention, wherein two signals corresponding to an input video signal are derived by an input circuit, the peak portions of one of the derived signals having an amplitude greater than a predetermined maximum are detected and inverted by a peak detecting and inverting circuit to produce an intermediate signal, and the intermediate signal and the other of the derived signals are combined by a combining circuit such that an output signal is produced which corresponds to the input video signal with the D.C. level of the peak portions attenuated.

In accordance with a further aspect of the invention, the detecting and inverting circuit comprises an emitter-follower transistor amplifier, a voltage dividing network, which is preferably variable, and a zener diode connected between the emitter of the amplifier and the voltage dividing network.

In accordance with a still further aspect of the invention, the combining circuit comprises a summing junction to which the collector of the amplifier and the non-detected signal are connected.

Other features and advantages of the invention will be set forth in, or apparent from, the detailed description of a preferred embodiment found herein below.

DETAILED DESCRIPTION OF THE PREFERRED EMBODIMENT

Figure 1:
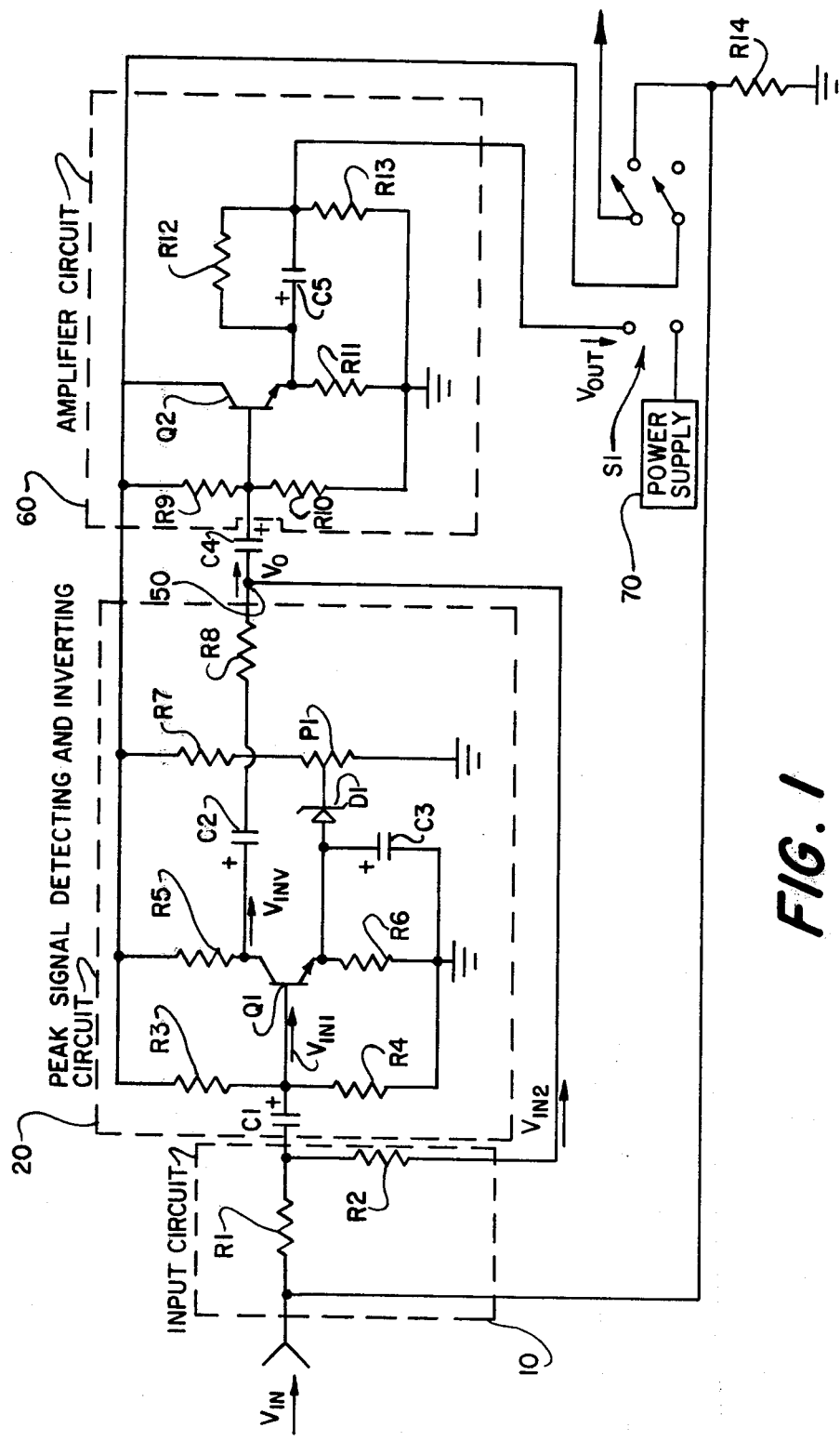
FIG. 1 is a schematic circuit diagram of a video highlight attenuation processor constructed in accordance with the present invention.

Referring to FIG. 1, a video highlight attenuation processor constructed in accordance with the present invention generally comprises input circuitry, generally denoted 10, for deriving from an incoming video signal $V_{IN}$ two duplicate signals $V_{IN1}$ and $V_{IN2}$, respectively, which are equivalent to signal $V_{IN}$; a peak signal detecting and inverting circuit, generally denoted 20, for detecting positive going peak portions of signal $V_{IN1}$ which have an amplitude greater than a predetermined maximum, and for inverting the detected peak signals to produce corresponding signals $V_{INV}$; a mixer 50 for combining signals $V_{INV}$ with signal $V_{IN2}$ so as to produce a signal $V_O$ which corresponds to input signal $V_{IN}$ with the D.C. level of the detected positive peak portions attenuated or removed; an amplifier circuit 60 for providing a low impedance output drive signal $V_{OUT}$ for a television monitor (not shown); and a power supply 70.

Input circuitry 10 advantageously comprises a resistive network comprising resistors R1 and R2 and a coupling capacitor C1 connected as shown. Exemplary values of resistors R1 and R2 are 27 ohms and 150 ohms, respectively, and an exemplary value of capacitor C1 as 10 microfarads (MFD).

Detecting and inverting circuit 20 comprises a transistor Q1 and a bypass capacitor C3 and biasing resistors R3, R4, R5, and R6 connecting transistor Q1 to power supply 70, as shown, so as to constitute an emitter follower amplifier; a resistor R7 and a potentiometer P1 connected as a voltage dividing network across power supply 70, as shown; and a zener diode D1 connected between the variable input of potentiometer P1 and the junction defined by resistor R6 and the emitter of transistor Q1, as shown. Adjustment of potentiometer P1 determines both the amplitude at which detection occurs and the amplitude of the inverted signal $V_{INV}$.

In a specific exemplary embodiment, transistor Q1 is a 2N2219 type transistor; resistors R3, R4, R5, R6 and R7 have values of 220K ohms, 10K ohms, 4.7K ohms, 60 ohms, and 220 ohms, respectively; capacitor C3 has a value of 100 MFD; potentiometer P1 has a value of 1K ohms; and diode D1 is a IN747A type diode.

In the preferred embodiment illustrated, mixer 50 is constituted by a summing junction. The output $V_{INV}$, which is produced at the collector of transistor Q1, is connected to mixer 50 by a coupling capacitor C2 and resistor R8, as shown. Exemplary values of capacitor C2 and resistor R8 are 10 MFD and 330 ohms, respectively.

The output $V_O$ of mixer 50 is connected, as shown, to the input of amplifier circuit 60 by a coupling capacitor C4, a preferred value of which is 10 MFD.

Amplifier circuit 60 advantageously is a conventional emitter follower amplifier comprising a transistor Q2; biasing resistors R9, R10, and R11 connected between transistor Q2 and power supply 70, as shown; and a coupling network comprising resistors R12 and R13 and a capacitor C5 connected as shown to the emitter of transistor Q2. Exemplary values of resistors R9, R10, R11, R12, and R13 are 1.5K ohms, 5.6K ohms, 330 ohms, 560 ohms, and 100 ohms, respectively. An exemplary value of capacitor C5 is 100 MFD, and transistor Q2 preferably is a 2N2219 type transistor.

A double-pole, double-throw switch S1 may also advantageously be provided, as shown, to which the input signal $V_{IN}$ and the output $V_{OUT}$ produced by the processor are connected such that either the unprocessed composite video signal from the television camera, or the highlight attenuated video signal produced by the processor of the present invention may be selectively fed to a monitor. As shown, a load resistor R14, which has an exemplary value of 100 ohms, may be provided between the pole of switch S1 to which signal $V_{IN}$ is connected and ground.

Figure 2:
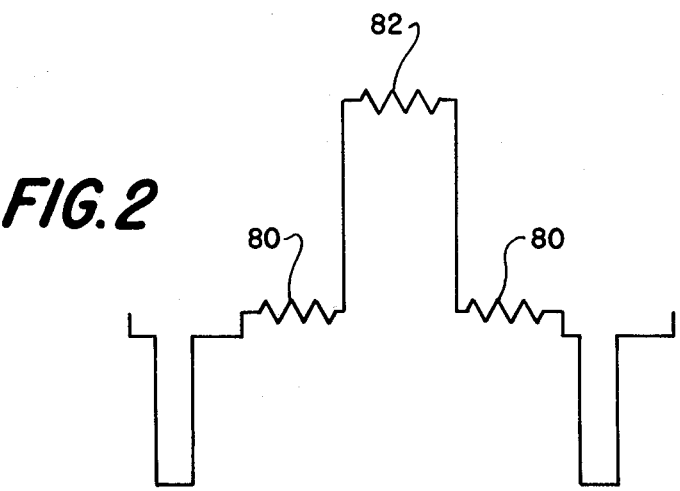
FIG. 2 is a graphic depiction of a typical composite video signal produced by a TV camera viewing a scene having bright spots therein.
Figure 2A:
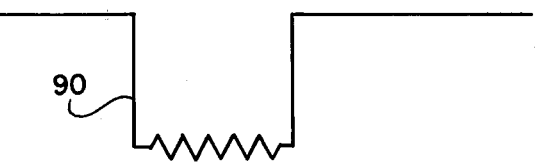
FIGS. 2(a) and 2(b) are graphic depictions of the waveforms of the signals at two different points in the circuit of FIG. 1.
Figure 2B:
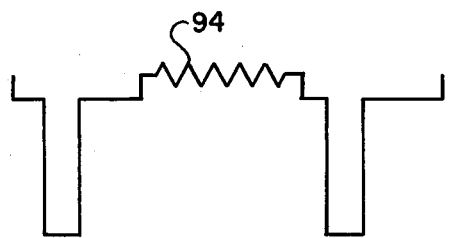

Typical waveforms illustrating the effect of a processor constructed in accordance with the present invention are shown in FIGS. 2 to 2(b). In FIG. 2, a composite video signal is depicted which is typically produced by a television camera viewing a scene having brightly lit areas therein. The portions of the scene which are lit by the ambient light levels are represented by the portions of the waveform denoted 80, and a brightly lit portion of the scene is represented by the peak portion of the waveform denoted 82.

The output $V_{INV}$ produced by peak detecting and inverting circuit 20 is shown in FIG. 2(a), and the combined signal produced at summing junction 50 is shown in FIG. 2(b). As shown, the effect of the processor of the invention is to attenuate the detected peak portions 80 of the incoming signal so as to remove the D.C. components thereof, while retaining the video information contained therein. Glare and blooming are eliminated without otherwise distorting the information within the scene areas giving rise to the glare and blooming problems. In addition, the absence of closed loops and rectification of the incoming signal avoids the introduction of any delays into the processed video signal.

Although the invention has been described with respect to an exemplary embodiment thereof, it will be understood that variations and modifications can be effected in the embodiment without departing from the scope or spirit of the invention.

I claim:

1. Anti-bloom apparatus for attenuating a video signal having peak portions produced by brightly lit areas in a scene being televised, the apparatus comprising:
   a. input means for receiving the video signal and for deriving first and second signals corresponding to the video signal,
   b. means for detecting and inverting the peak portions of said first signal having an amplitude greater than a predetermined maximum to produce an intermediate signal, and
   c. means for combining said intermediate signal with said second signal such that an output signal is produced which corresponds to the video signal with the D.C. level of the peak portions attenuated.

2. The apparatus of claim 1 wherein said detecting and inverting means comprises an emitter follower transistor amplifier, a voltage dividing network, and a zener diode connected between the emitter of said transistor amplifier and said voltage dividing network.

3. The apparatus of claim 2 wherein said combining means comprises means defining a summing junction and means connecting the collector of said transistor amplifier and said second signal to said summing junction defining means.

4. The apparatus of claim 2 wherein said voltage dividing network comprises variable resistive means to which said zener diode is connected.

* * * * *